United States Patent [19]

Hanazawa

[11] Patent Number: 5,307,690
[45] Date of Patent: May 3, 1994

[54] TEMPERATURE COMPENSATING DEVICE FOR TORQUE MEASURING APPARATUS

[75] Inventor: Akiyoshi Hanazawa, Yao, Japan

[73] Assignee: Kubota Corporation, Osaka, Japan

[21] Appl. No.: 919,953

[22] Filed: Jul. 27, 1992

[30] Foreign Application Priority Data

Jul. 29, 1991 [JP] Japan .................................. 3-187960
Jul. 8, 1992 [JP] Japan .................................. 4-180158

[51] Int. Cl.⁵ .............................................. G01L 3/10
[52] U.S. Cl. ........................... 73/862.333; 73/862.331
[58] Field of Search .................... 73/862.333, 862.334, 73/862.335, 862.336

[56] References Cited

U.S. PATENT DOCUMENTS 4,972,726  11/1990  Yoshimura et al. ............ 73/862.333
4,989,460  2/1991  Mizuno et al. .................. 73/862.36

Primary Examiner—Richard E. Chilcot, Jr.
Assistant Examiner—R. Biegel
Attorney, Agent, or Firm—Joseph W. Farley

[57] ABSTRACT

A temperature compensating device for a torque measuring apparatus of the magneto-strictive type. A torque transmission shaft has a magnetically anisotropic portion formed on the periphery of the shaft. A sensing coil is disposed around the torque transmission shaft in corresponding relation to the magnetically anisotropic portion. A DC voltage from a constant voltage generator is supplied to the sensing coil. A torque detection signal is derived from the AC component of the voltage developed across the sensing coil, and the DC resistance of the sensing coil is detected from the DC component of the voltage, whereby the temperature of the sensing coil is detected. The torque detection characteristics of the apparatus is temperature-compensated on the basis of the temperature detection signal.

11 Claims, 16 Drawing Sheets

TEMPERATURE COMPENSATING DEVICE FOR TORQUE MEASURING APPARATUS

FIELD OF THE INVENTION

This invention relates to a temperature compensating device for a torque measuring apparatus.

BACKGROUND OF THE INVENTION

Torque measuring apparatuses are known which are of the type having a pair of magnetically anisotropic portions formed on the periphery of the torque transmission shaft such that a change in the magnetic permeability of the magnetically anisotropic portions, when torque is applied to the shaft, is detected by a pair of sensing coils disposed adjacent the magnetically anisotropic portions, so that the magnitude of the torque acting on the shaft is converted into an electric signal on the basis of the difference between the detection signals from the sensing coils. Typically, torque measuring apparatuses of this sort have been proposed in, for example, Japanese Patent Application Laying-Open Publication No. 64-29723 and No. 63-33634.

In such torque measuring apparatus, sensor means comprises a shaft portion having magnetically anisotropic portions formed thereon, and other elements such as sensing coils and exciting coils. When a temperature change occurs in the sensor means, the magnetic and electrical characteristics of the sensor means are subject to changes. As a consequence, the torque sensing characteristics of the sensor means undergo considerable changes which in turn unfavorably affect the sensing accuracy of the sensor means. This poses a problem when torque is to be measured with respect to such kinds of equipment as industrial machinery, motors, engines, and automobiles, in which comparatively high temperatures are prevalent when they are in operation.

In the foregoing Japanese laying-open publication Nos. 64-29723 and 63-33634, therefore, it is arranged that the sensor means includes built-in temperature sensing elements, such as thermistors or thermo-sensitive resistances, or elements are provided for detecting the alternating exciting currents of the exciting coils thereby to detect the temperature at the sensor means, so that torque detection signals are temperature-compensated on the basis of the detection signals from such elements.

However, the provision of built-in temperature sensing elements in the sensor means results in increased number of parts, including cable lines required for transmission of temperature detection signals from the elements. This makes the construction and assembly of the sensor means very much complicated as a whole. Another problem is that variations in the inherent properties of the elements may result in variations in temperature characteristics.

Where the apparatus is adapted for detection of the alternating exciting currents of the exciting coils, the sum of changes due to temperature in the magnetic and electrical characteristics of individual components, such as shaft, coils, shields, and casing, which define a coil impedance is utilized to give a temperature detection signal. As such, characteristic variations, if any, of the components per se or as caused during assembly operation thereof may unfavorably affect the temperature detection accuracy of the sensor means. Another problem is that when torque is applied on the shaft, the exciting current is likely to fluctuate to some extent, because the construction and material of the sensor means cannot be of magnetically and electrically complete symmetry thereacross even if the apparatus is of the differential detection type. Moreover, it must be noted that the higher the temperature, the lower is the magnetic permeability $\mu$ of the sensor components, while on the other hand the higher the temperature, the higher is the resistivity $\rho$ of the sensor components. Also, it must be noted that the lower the magnetic permeability $\mu$, the lower is the impedance of the exciting coils, whereas the higher the resistivity $\rho$, the higher is the impedance of the exciting coils. Therefore, changes due to temperature of the impedance of the exciting coils eventually become smaller as changes due to temperature of both the magnetic permeability $\mu$ and the resistivity $\rho$ negate each other. Accordingly, changes of the exciting currents per se due to temperature changes become smaller and this necessitates a sensing circuit of higher sensitivity and higher detection accuracy. As such, no sufficient temperature compensation can be obtained, with an added disadvantage that the cost of the apparatus is unacceptably high.

DISCLOSURE OF THE INVENTION

The present invention is intended to provide a solution to these problems and a simple and inexpensive arrangement which enables accurate detection of temperatures at the sensor means thereby to insure positive temperature compensation.

In order to accomplish this objective, according to the invention there is provided a temperature compensating device for a torque measuring apparatus of the magneto-strictive type including a magnetically anisotropic portion formed on the periphery of a torque transmission shaft, and a sensing coil provided in corresponding relation to the magnetically anisotropic portion, so that an alternating current signal corresponding to the magnitude of a torque applied to the torque transmission shaft is output from the sensing coil for measurement of the magnitude of the torque, said temperature compensating device comprising means for detecting the direct current resistance of the sensing coil thereby to detect the temperature of the sensing coil, and means for temperature-compensating the detecting characteristics of the torque measuring apparatus on the basis of a detection signal from said detecting means.

When the temperature at the location at which the sensing coil is disposed becomes higher or lower, the direct current resistance of the sensing coil increases or decreases accordingly. Mean temperature coefficient $\alpha_{0,100}$ for volume resistivity $\rho$ of the coil copper wire at 0°–100° C. is expressed by the following formula:

$$\alpha_{0,100} = (\rho_{100} - \rho_0)/(100 \cdot \rho_0)$$

More specifically, it has been ascertained as $\alpha_{0,100} = 4.3 \times 10^{-3}$, with very few variations involved (wherein $\rho_{20} = 1.72 \times 10^{-8}$ ($\Omega \cdot$m)). Therefore, detection of this direct current resistance enables detection of the corresponding temperature of the sensing coil, or the sensor temperature.

In this case, the torque detection signal is an AC signal and, therefore, by cutting off the DC component of the signal it is possible to readily detect the torque. In other words, the torque is detected by the AC component of the signal from the sensing coil, and the sensor temperature is detected by the DC component. The magnetic field arising from the temperature detecting direct current has little effect on the accuracy of torque detection because it can be substantially reduced. Furthermore, through provision of sensing coils in a pair, arranged characteristically opposite, the direct current magnetic fields may be canceled relative to each other.

A similar result may be obtained by detecting the direct current resistance of an exciting coil for excitation of the sensing coil, instead of detecting the direct current resistance of the sensing coil.

The use of the DC resistance only of the coil for the purpose of temperature detention results in the following advantages:

(1) that the accuracy of temperature detection is unlikely to be affected by the magnetic characteristics, dimensional accuracy, and/or assemblage accuracy of other components of the magnetic circuit, such as shaft, shield, and casing, which fact permits a highly reliable and highly accurate temperature detection;

(2) that the temperature resistance coefficient (direct current resistance) of the coil is greater than the temperature coefficient of coil impedance ($\alpha_{0,100} = 1 - 2 \times 10^3$) with respect to the coil and other components and is stable, the coefficient taking a value $\alpha_{0,100} = 4.3 \times 10^{-3}$, for example, as earlier noted; therefore, it is possible to construct a circuit having high-accuracy temperature detection capabilities by utilizing inexpensive elements;

(3) that each temperature detection signal will not vary, even if torque is applied to the shaft; and (4) that temperature detection can be effected independent of various sensor-exciting conditions, such as voltage, current, and frequency, which fact provides ease of adjustment during the process of fabrication, decrease in the number of adjustment steps involved, and good saving in production cost, with an added advantage of no additional part being required for the sensor section.

In another embodiment of the temperature compensating means for a torque measuring apparatus according to the invention, the AC exciting current for excitation of the sensing coil is a resultant current consisting of currents of two different frequencies, a high-frequency current for torque detection signaling and a low-frequency current for equipment-temperature detection signaling. Further, the temperature compensating means includes means for detecting the temperature of equipment on the basis of a temperature detection low-frequency signal from the sensing coil, and means for temperature-compensating a torque detection signal on the basis of a detection signal from the detecting means.

According to such arrangement, each low-frequency signal is unlikely to be influenced by the magnetically anisotropic portion formed on the periphery of the torque transmission shaft, since magnetic flux can pass into the center of the torque transmission shaft. Further, when a known differential detection system is employed, the low-frequency signal will respond only to the temperature of the equipment and not to the torque. Therefore, it is possible to provide a temperature detection signal by deriving the low-frequency signal component only through a filter circuit of the known type, and thus a torque detection signal is temperature-compensated on the basis of the temperature detection signal. In this way, both torque and temperature detections can be effected; and the torque detection and temperature detection signals will not have any influence upon each other and are almost completely separable from each other. Through a simple arrangement, therefore, it is possible to achieve temperature compensation with high accuracy.

DESCRIPTION OF THE EMBODIMENTS

Figure 1:
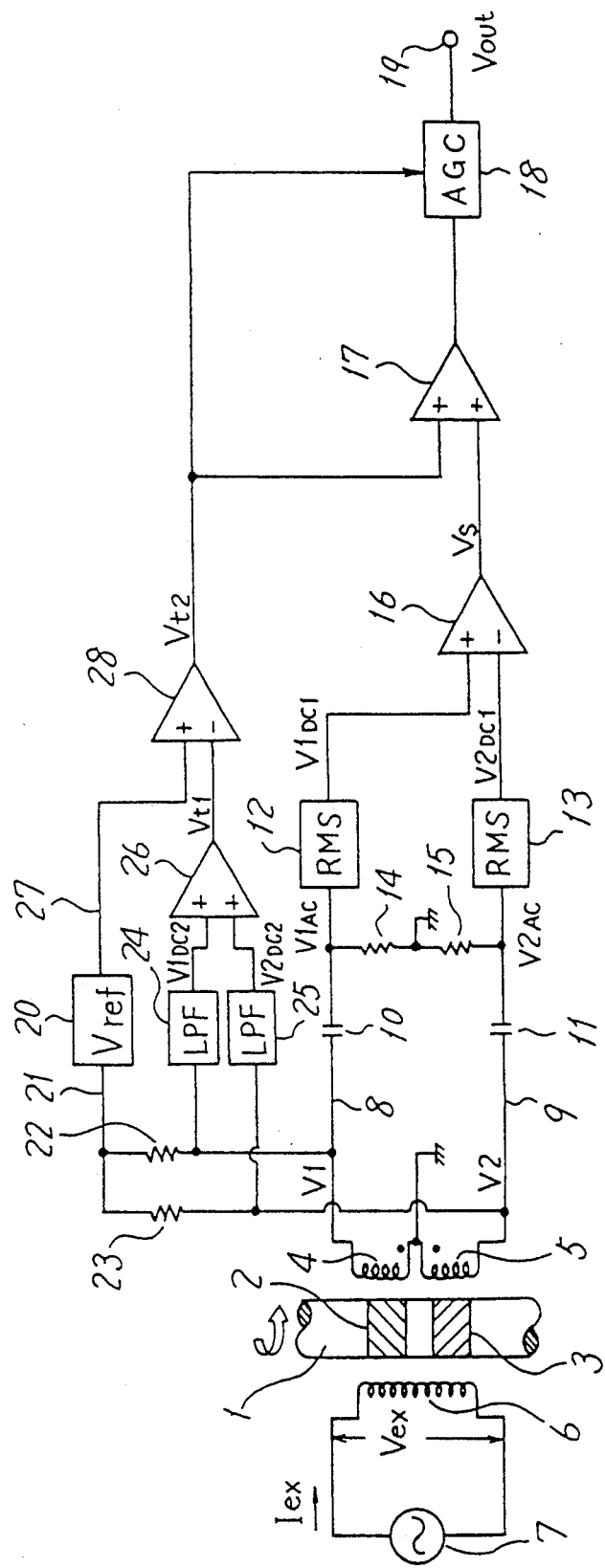
FIG. 1 is a circuit diagram of a torque measuring apparatus representing a first embodiment of the present invention.

FIG. 1 illustrates a first embodiment of the invention. Reference numeral 1 designates a torque transmission shaft constructed of a material having both magnetically soft and magnetically strict properties. The shaft 1 has a pair of magnetically anisotropic portions 2, 3 formed on its periphery which are inclined at an angle of about ±45 degrees to the axis of the shaft 1 and in opposite directions from each other, the magnetically anisotropic portions 2, 3 consisting of a large number of grooves or the like. Disposed around the magnetically anisotropic portions 2, 3 are a pair of sensing coils 4, 5 corresponding to the respective magnetically anisotropic portions 2, 3, and a single exciting coil 6 for exciting the sensing coils 4, 5. The sensing coils 4, 5 are arranged in reversed polarity. The exciting coil 6 is connected to an AC constant voltage source 7. Shown by Vex and Iex are an exciting voltage and an exciting current respectively.

Output lines 8, 9 from the sensing coils 4, 5 are connected respectively to inputs of rectifier filters 12, 13 through DC component removing capacitors 10, 11. The rectifier filters 12, 13, after full-wave rectification of an alternating current, output the effective value (RMS) of the rectified current. Shown at 14, 15 are input resistances for sensor output balancing. The outputs of the rectifier filters 12, 13 are connected to inputs of an arithmetic unit 16 for subtraction. The output of the arithmetic unit 16 is conducted to an output terminal 19 through an arithmetic unit 17 for addition and further through an auto gain controller 18.

Shown by 20 is a DC constant voltage generator having a first output line 21 connected through voltage division resistors 22, 23 to output terminals of the sensing coils 4, 5 as located prior to the capacitors 10, 11. The output terminals of the sensing coils 4, 5 are connected to the input of the arithmetic unit 26 for addition via rectifier filters 24, 25. The rectifier filters 24, 25 operate to remove an AC signal component from signals input thereto and to output a DC bias component only. The output of the arithmetic unit 26, and a second output line 27 of the constant voltage generator 20, are connected to the input of a comparator 28. The output of the comparator 28 is connected to the input of the arithmetic unit 17 and is also connected to the auto gain controller 18 to adjust the amplification factor of the auto gain controller 18.

Figure 6:
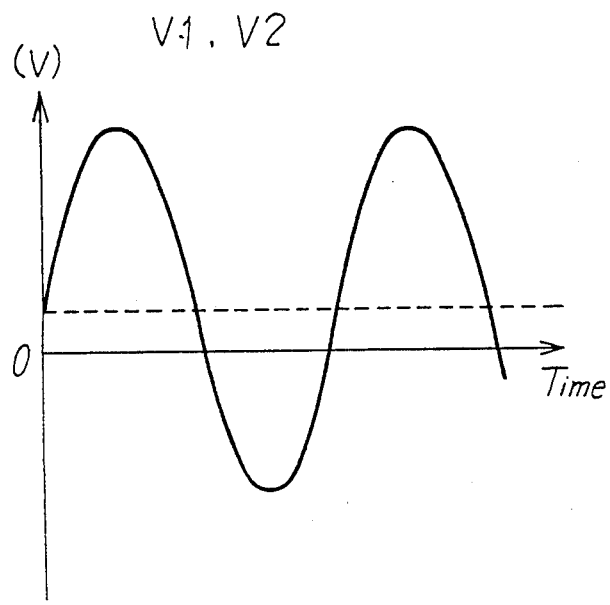
FIG. 6 is a diagram showing by way of example outputs V1, V2 of the FIG. 1 circuit.

According to such arrangement, changes in the magnetic permeability of the magnetically anisotropic portions 2, 3 due to the torque acting on the shaft 1 are detected by the sensing coils 4, 5 across which are developed corresponding AC outputs V1, V2. FIG. 6 shows outputs V1, V2 by way of example. The AC amplitude of the AC outputs V1, V2 varies according to the magnitude of the torque applied to the shaft 1. A DC current is supplied to the sensing coils 4, 5 by the constant voltage generator 20. Outputs V1, V2 contain the DC bias component of this DC current.

Figure 7:
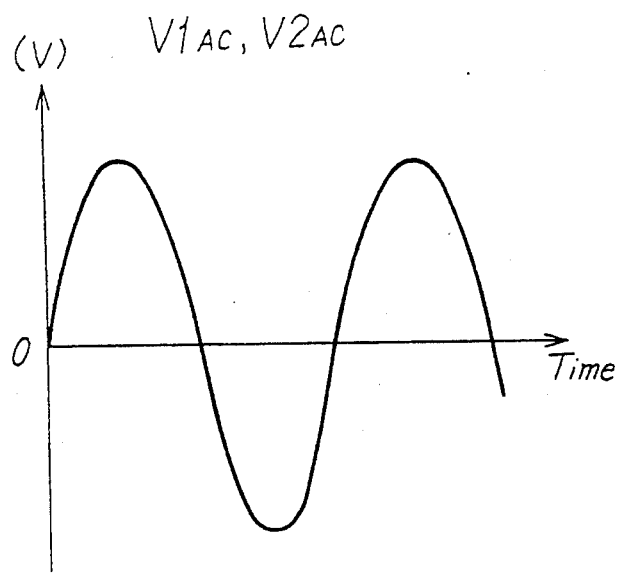
FIG. 7 is a diagram showing by way of example detection signals $V1_{AC}$, $V2_{AC}$ in the FIG. 1 circuit.
Figure 8:
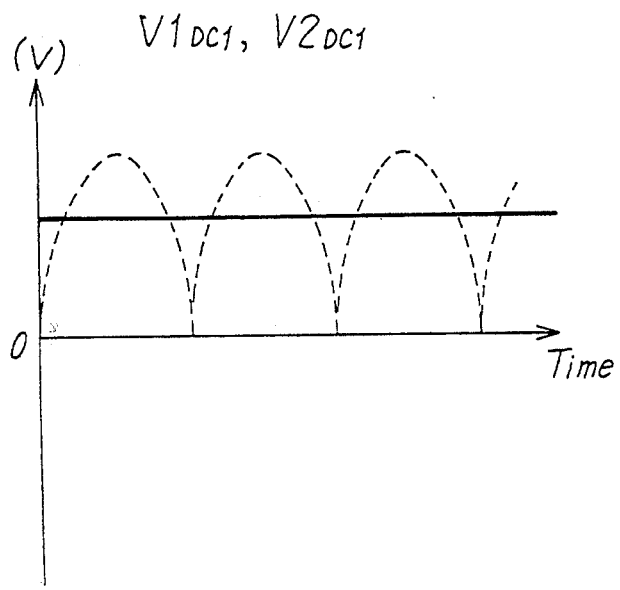
FIG. 8 is a diagram showing by way of example direct current outputs $V1_{DC1}$, $V2_{DC1}$.

Detection signals $V1_{AC}$, $V2_{AC}$ consisting of AC components only which are free of the influence of the DC bias current from the constant voltage generator 20 are allowed to pass through the capacitors 10, 11 and are in turn passed through the rectifier filters 12, 13, whereby DC outputs $V1_{DC1}$, $V2_{DC1}$, as effective values of AC amplitudes of AC outputs V1, V2 corresponding to the magnitude of the torque, can be obtained. Examples of these detection signals $V1_{AC}$, $V2_{AC}$ and DC outputs $V1_{DC1}$, $V2_{DC1}$ are illustrated in FIGS. 7 and 8 respectively.

Figure 2:
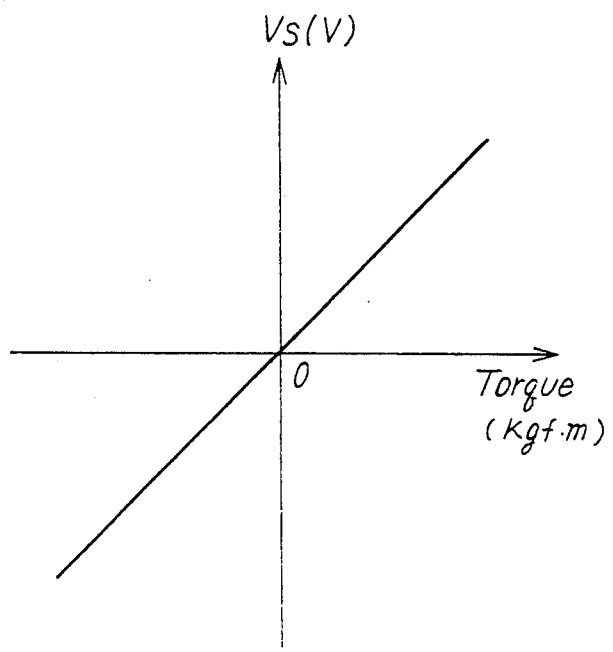
FIG. 2 is a diagrammatic view showing by way of example a torque detection signal in the circuit of FIG. 1.

The magnetically anisotropic portions 2, 3 are inclined in opposite directions. Therefore, when torque is applied to the shaft 1 to cause tension to act upon one of the magnetically anisotropic portions, a compressive force acts on the other magnetically anisotropic portion. Consequently, therefore, the DC output $V1_{DC1}$ at the one sensing coil 4 is increased with an increase in torque, whereas the DC output $V2_{DC1}$ at the other sensing coil 5 is decreased accordingly. Then, the difference Vs ($=V1_{DC1}-V2_{DC1}$) between the two DC outputs $V1_{DC1}$, $V2_{DC1}$ is calculated in the arithmetic unit 16, the difference Vs serving as a signal corresponding to the change in torque as shown in FIG. 2.

Figure 9:
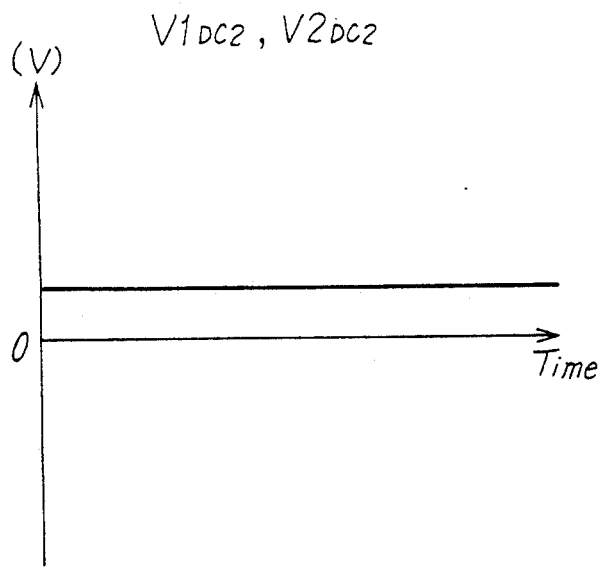
FIG. 9 is a diagram showing by way of example direct current signals $V1_{DC2}$, $V2_{DC2}$.

A DC reference voltage supplied from the constant voltage generator 20 via the first output line 21 is divided by DC resistance of the sensing coils 4, 5 and resistors 22, 23. Then, outputs V1, V2 developed at terminals of the sensing coils 4, 5 are cleaned of their AC signal components by the rectifier filters 24, 25 so that their DC bias voltage components only are passed through the filters, DC signals $V1_{DC2}$, $V2_{DC2}$ being thus obtained. FIG. 9 shows such DC signals $V1_{DC2}$, $V2_{DC2}$ by way of example.

Figure 3:
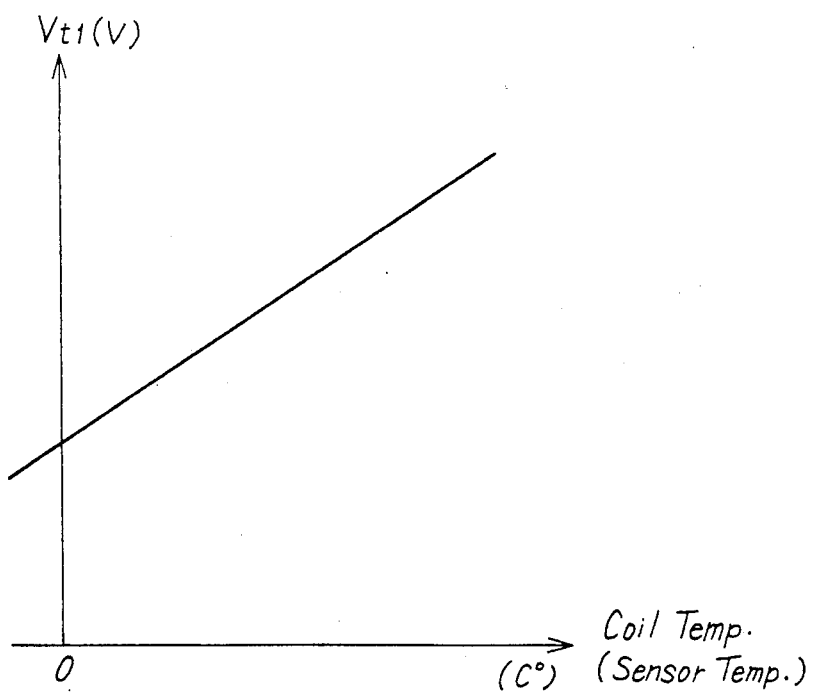
FIG. 3 is a diagrammatic view showing the relationship between coil temperatures in the FIG. 1 circuit and detection signals with respect to the direct current resistance of the coils.

The DC resistance of the sensing coils 4, 5 do not respond to the torque applied to the shaft 1, but vary with the temperature thereof, that is, the temperature of the sensor section. For example, as the temperature becomes higher, the value of resistance does increase. Therefore, DC bias voltages developed in the sensing coils 4, 5, that is, DC signals provided through the rectifier filters 24, 25, vary in proportion to the temperature only. Hence, these DC signals $V1_{DC2}$, $V2_{DC2}$ are input to the arithmetic unit 26 which in turn outputs a coil temperature detection signal $Vt_1$. FIG. 3 shows changes of detection signal $Vt_1$ with temperature changes.

In the comparator 28, this detection signal $Vt_1$ is compared with the other reference voltage supplied from the constant voltage generator 20 through the second input line 27. A temperature compensating signal $Vt_2$ is output from the comparator 28, and this temperature compensating signal $Vt_2$, together with a signal Vs from the arithmetic unit 16, is input to the arithmetic unit 17. On the basis of the temperature compensating signal $Vt_2$, the arithmetic unit 17 temperature-compensates any error of signal Vs due to the fluctuation of the output at zero point. Each temperature compensating signal $Vt_2$ is also input to the auto gain controller 18. At the auto gain controller 18, the amplification factor of temperature is adjusted according to the temperature compensating signal $Vt_2$, and any error due to the fluctuation of the torque detection sensitivity is temperature-compensated with respect to a signal from the arithmetic unit 17.

Figure 4:
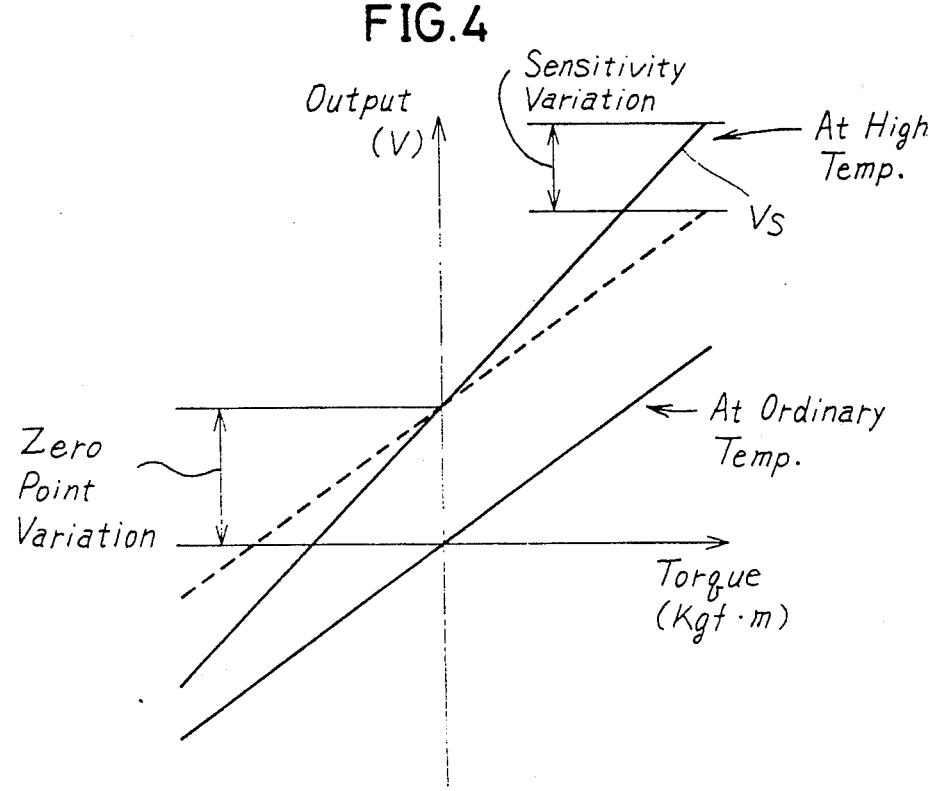
FIG. 4 is a diagrammatic view showing in comparison the torque detection characteristics of the FIG. 1 circuit at ordinary temperatures and the torque detection characteristics of the circuit at high temperatures and prior to temperature compensation.
Figure 5:
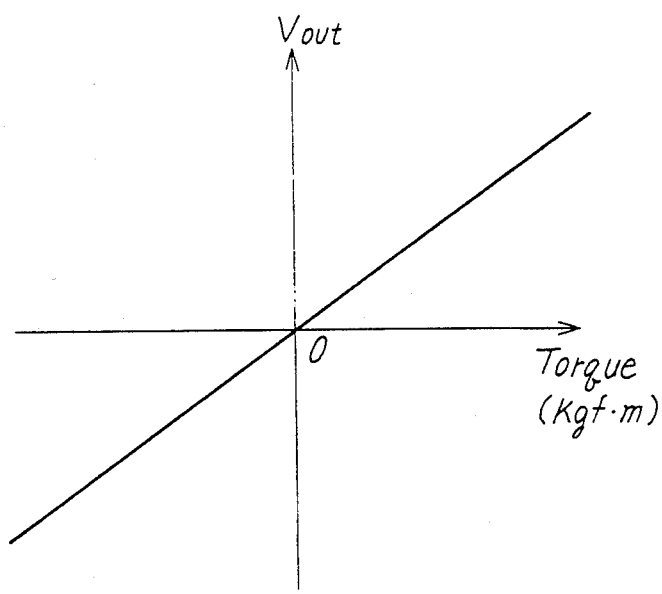
FIG. 5 is a diagrammatic view showing the detection characteristics, after temperature compensation, of the FIG. 1 circuit at high temperatures.

FIG. 4 is a graph explaining errors involved in signals Vs due to fluctuations at zero point and sensitivity fluctuations at high temperature times, as compared with output characteristics at ordinary temperatures. In this way, temperature compensation at zero-point and sensitivity fluctuations is effected as noted above, with the result that a detection signal Vout which is not different from that at ordinary temperatures is developed at the output terminal 19 as shown in FIG. 5.

Figure 10:
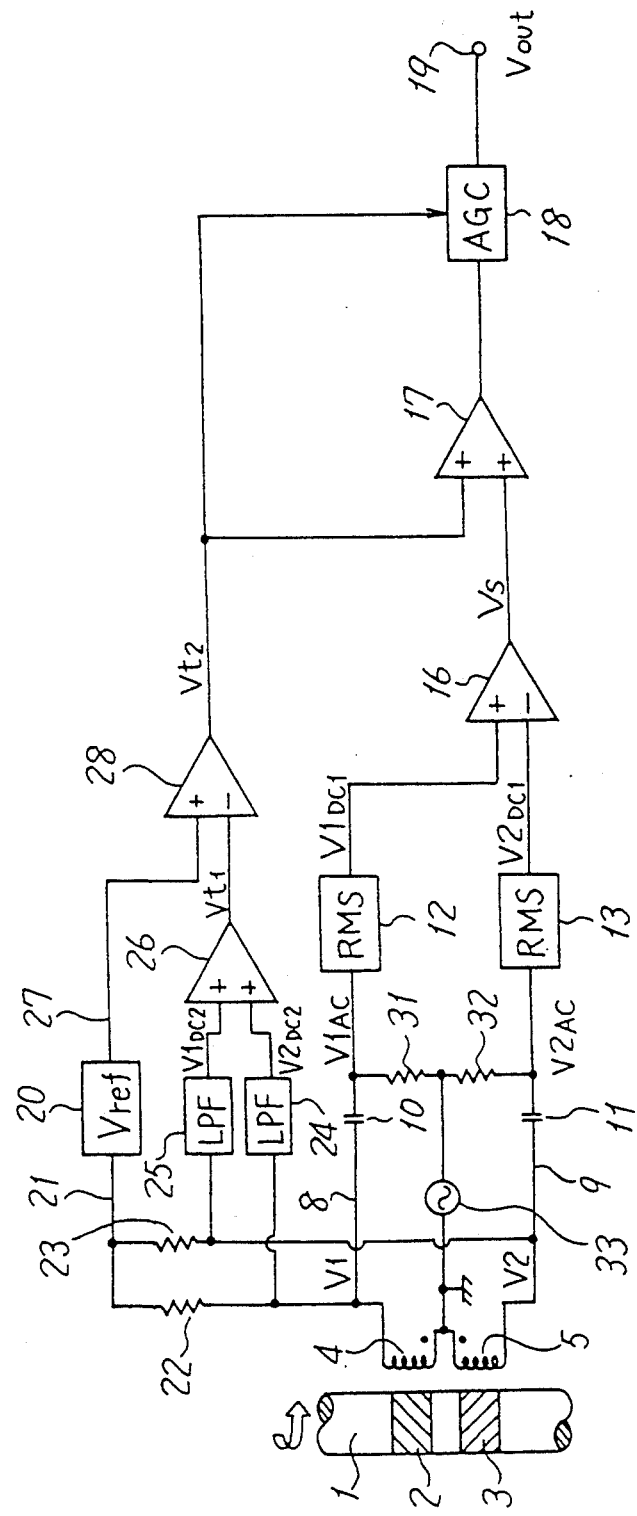
FIGS. 10 to 15 are circuit diagrams of respective torque measuring apparatuses representing second to seventh embodiments of the present invention.

FIG. 10 illustrates a second embodiment of the invention. In this embodiment, the exciting coil 6 as shown in FIG. 1 is not employed and an exciting current is supplied directly to the sensing coils 4, 5. A pair of resistances 31, 32 are connected in series between the outputs of the capacitors 10, 11, and a circuit bridge is made up of the sensing coils 4, 5 and these resistances 31, 32. An AC constant voltage source 33 is provided between the junction of the sensing coils 4, 5 and the junction of the resistances 31, 32. Other details of the construction are just same as those shown in FIG. 1.

According to such arrangement, the sensing coils 4, 5 are excited by a current from the constant voltage source 33 and, therefore, it is possible to measure any torque applied to the shaft 1 by using a simple circuit configuration having no exciting coil. In other respects, the manner of operation for temperature compensation is similar to that shown in FIG. 1.

Figure 11:
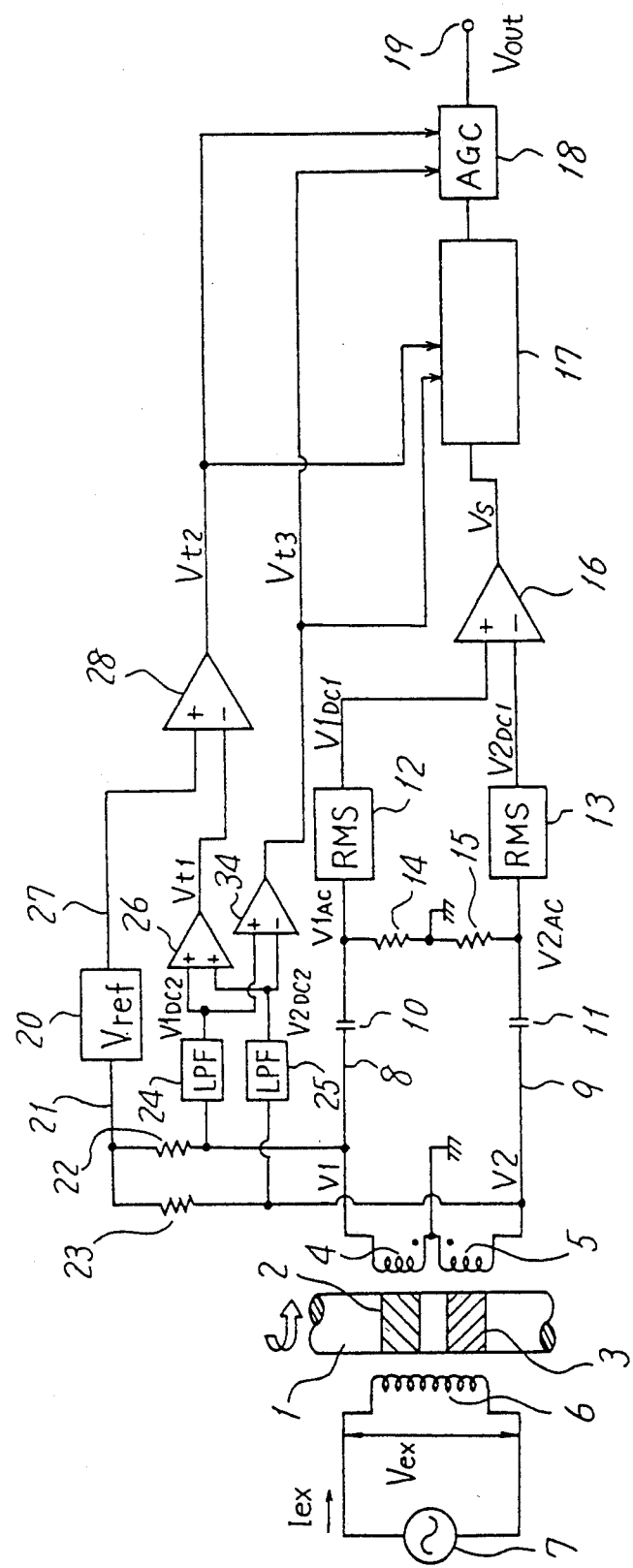

FIG. 11 illustrates a third embodiment of the invention. In this embodiment, an arithmetic unit 34 for calculating the difference between output signals $V1_{DC2}$ and $V2_{DC2}$ from the rectifier filters 24, 25 is added. Where a temperature gradient is present in the sensor section by reason of there being some difference between the temperatures at opposite ends of the torque transmission shaft 1 or otherwise, the temperatures at the sensing coils 4, 5 are different, and this may be a cause of error. In the case where such a temperature gradient is present to cause a temperature difference between the sensing coils 4, 5, therefore, an imbalance between the DC resistances of the sensing coils 4, 5 can be utilized for the purpose of the invention, which imbalance is detected by the arithmetic unit 34.

When any such imbalance is present, a temperature gradient compensating signal $Vt_3$ is output from the arithmetic unit 34, and this signal $Vt_3$ is input to the arithmetic unit 17 and also to the auto gain controller 18. In the arithmetic unit 17 and auto gain controller 18, not only is temperature compensation made with respect to the above noted zero point and sensitivity, but also compensation is effected with respect to the temperature gradient.

Figure 12:
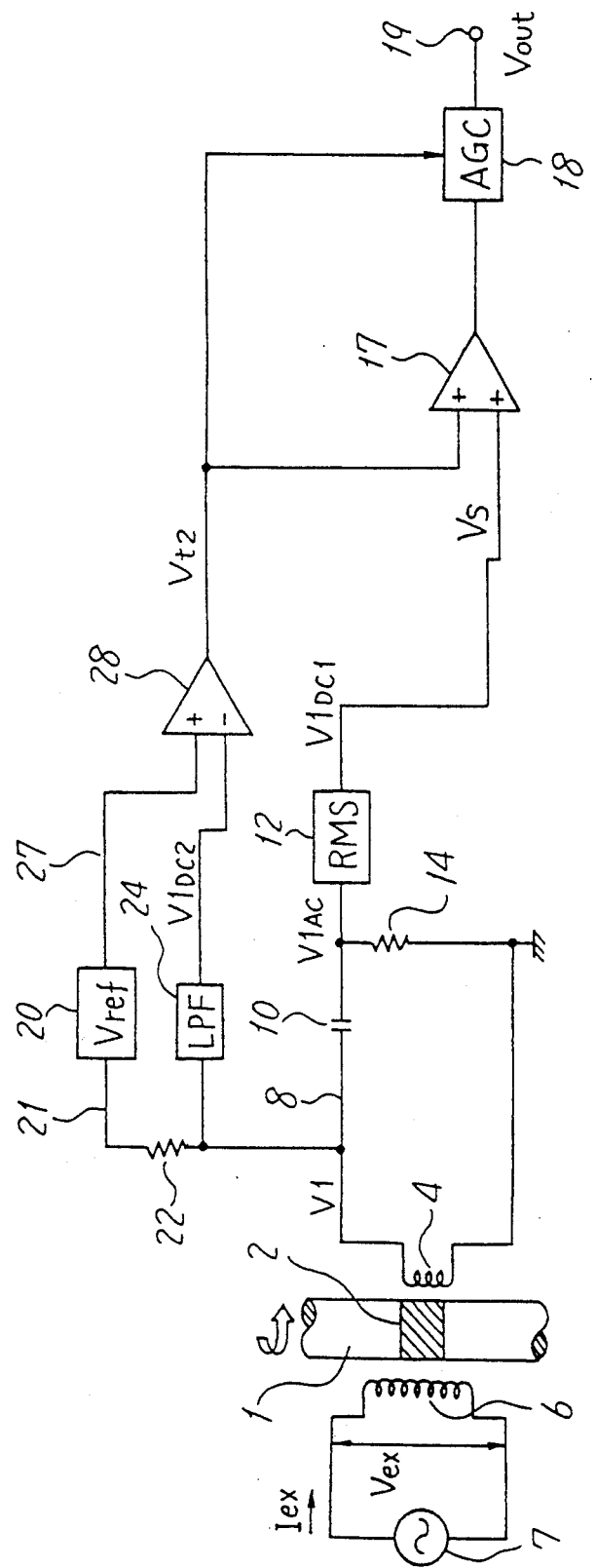

FIG. 12 shows a fourth embodiment of the invention. In this embodiment, only a single magnetically anisotropic portion 2 is formed on the periphery of the torque transmission shaft 1, and accordingly there is provided only one corresponding sensing coil 4. In the known temperature detecting means as described earlier, which are adapted to detect the thermo-sensitive resistances and AC exciting resistances as provided within the circuit, it is necessary to cancel unnecessary signal components using a pair of magnetically anisotropic portions inclined in opposite directions, or otherwise no accurate temperature detection can be effected. However, where the direct current resistance of the sensing coil is detected for the purpose of temperature detection as in the present invention, it is possible to achieve accurate temperature detection without cancelling such signal component. The manner of operation for compensating temperatures with respect to zero point and sensitivity on the basis of the detected temperature is similar to that described with respect to the foregoing embodiments.

Figure 13:
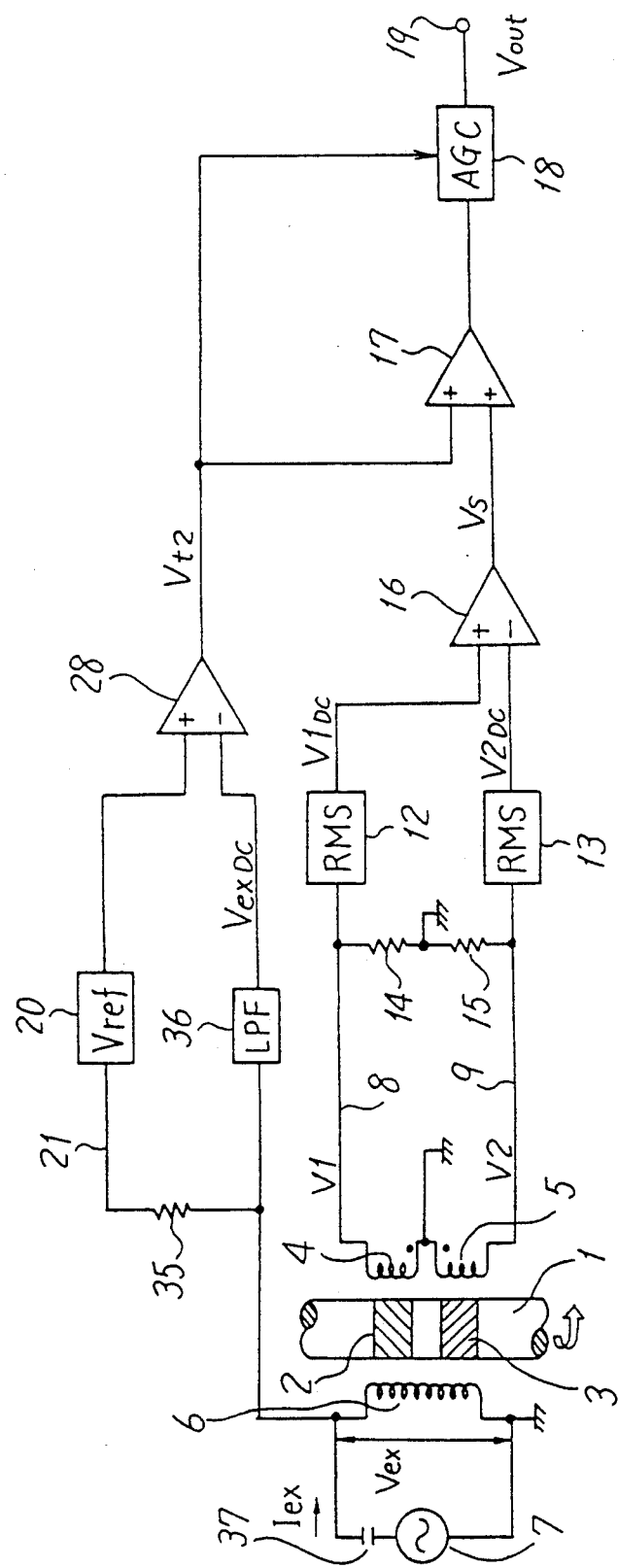

FIG. 13 shows a fifth embodiment of the invention. While in the foregoing embodiments the sensor temperature is detected from the direct current resistance of the sensing coils, in the present embodiment the sensor temperature is detected from the direct current resistance of the exciting coil 6. For this purpose, the first output line 21 from the DC constant voltage generator 20 is connected to the exciting coil 6 through voltage division resistance 35. Shown by 36 is a rectifier filter. A capacitor 37 for DC component removal is provided between the point of that connection and the AC constant voltage source 7. According to such arrangement, it is possible to detect sensor temperatures in same way as in the case of detecting the DC resistance of the sensing coils.

Figure 14:
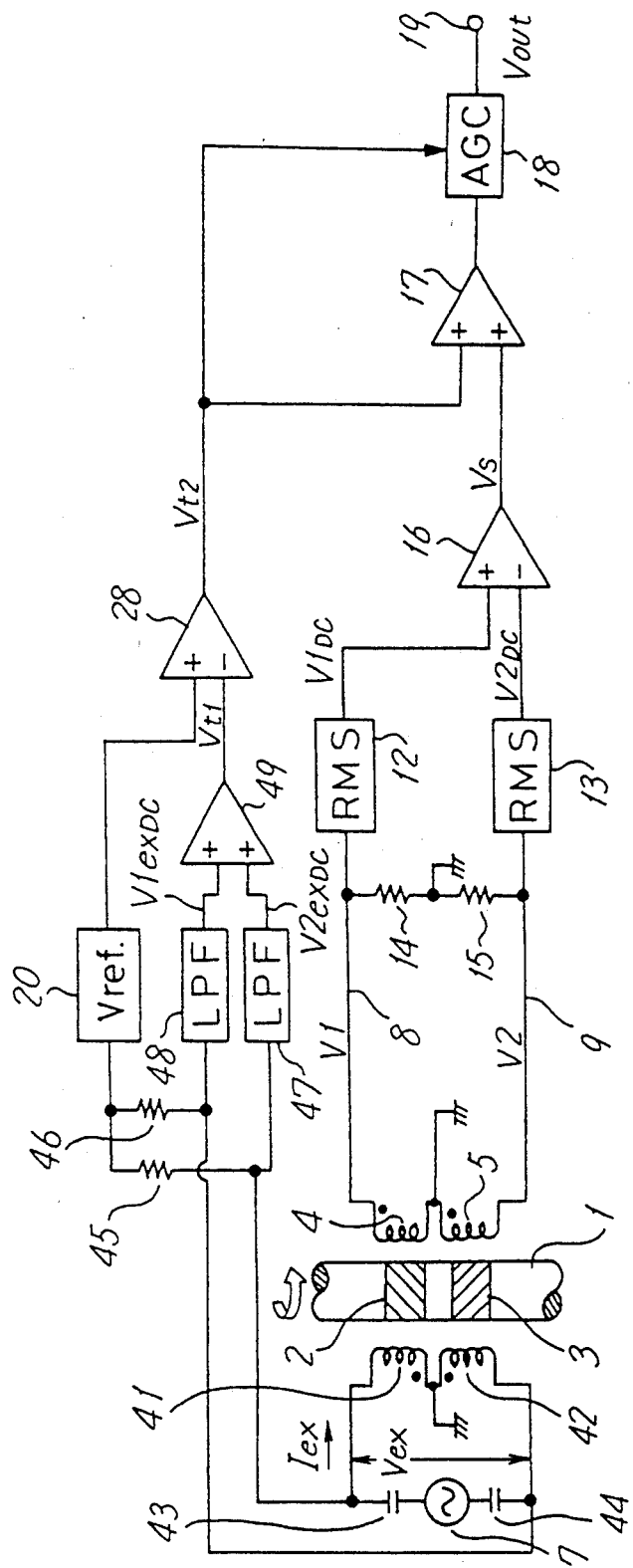

FIG. 14 shows a sixth embodiment of the invention. In the FIG. 13 embodiment, an exciting coil 6 extending over the two magnetically anisotropic portions 2, 3 is shown, but in the present embodiment exciting coils 41, 42, as well as the sensing coils 4, 5, are provided in one pair in corresponding relation to the magnetically anisotropic portions. Shown at 43, 44 are capacitors for DC component removal. A pair of exciting coils 41, 42 are arranged in this way, and accordingly voltage division resistances 45, 46 and rectifier filters 47, 48 are also arranged in pairs. The outputs of the rectifier filters 47, 48 are connected to the input of an arithmetic unit 49 for addition. Outputs $V1ex_{DC}$, $V2ex_{DC}$ of the rectifier filters 47, 48 are added up at the arithmetic unit 49 and the resulting value is output as a coil temperature detection signal $Vt_1$.

Such arrangement, when constructed in the same manner as in the FIG. 11 embodiment, is conveniently applicable in the case where a temperature gradient is present in the sensor section by reason of there being a temperature difference between opposite ends of the torque transmission shaft 1.

Figure 15:
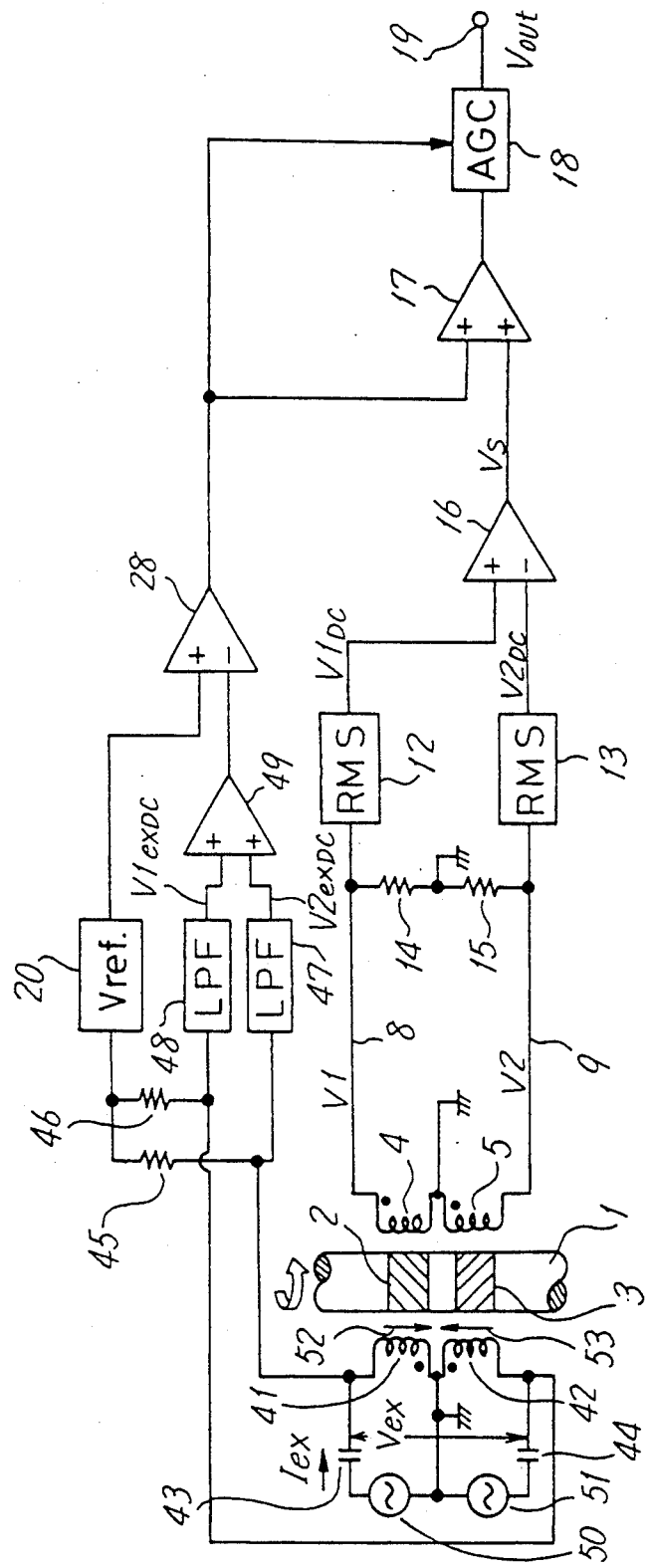

FIG. 15 depicts a seventh embodiment of the invention. In this embodiment, in contrast to the FIG. 14 embodiment, a pair of exciting coils 41, 42 are arranged in reversed polarity. Further, separate AC exciting power supplies 50, 51 are connected to the exiting coils 41, 42, and the AC exciting power supplies 50, 51 are shifted 180 degrees in phase relative to each other.

According to such arrangement, since the exciting coils 41, 42 are arranged in reversed polarity, magnetic fields 52, 53 as developed due to the DC currents supplied from the constant voltage generator 20 are oriented in opposite directions to negate each other, it being thus possible to prevent possible decrease in measuring accuracy due to the presence of DC components in the exciting currents. It is noted in this connection that although the exciting coils 41, 42 are arranged in reversed polarity, the AC exciting power supplies 50, 51 are shifted 180 degrees in phase, the magnetic fields developed from the AC exciting currents are in same direction with respect to the exciting coils 41, 42; therefore, in no case will the magnetic fields negate each other.

Such fields 52, 53 based on direct current components are effective in the case where the distance between the coils 41, 42 and/or between the magnetically anisotropic portions 2, 3 is rather small, because they are effectively negated especially between adjacent ends of the coils 41, 42. Such fields 52, 53 are also effective especially in the case of a torque measuring apparatus having higher detection sensitivity because of the material of the torque transmission shaft 1 or some other factor and in which the influence of DC components cannot be disregarded.

In this embodiment, the sensing coils 4, 5 are in same polarity as shown, whereby induced voltages as AC outputs V1, V2 can be efficiently caused to develop.

Figure 16:
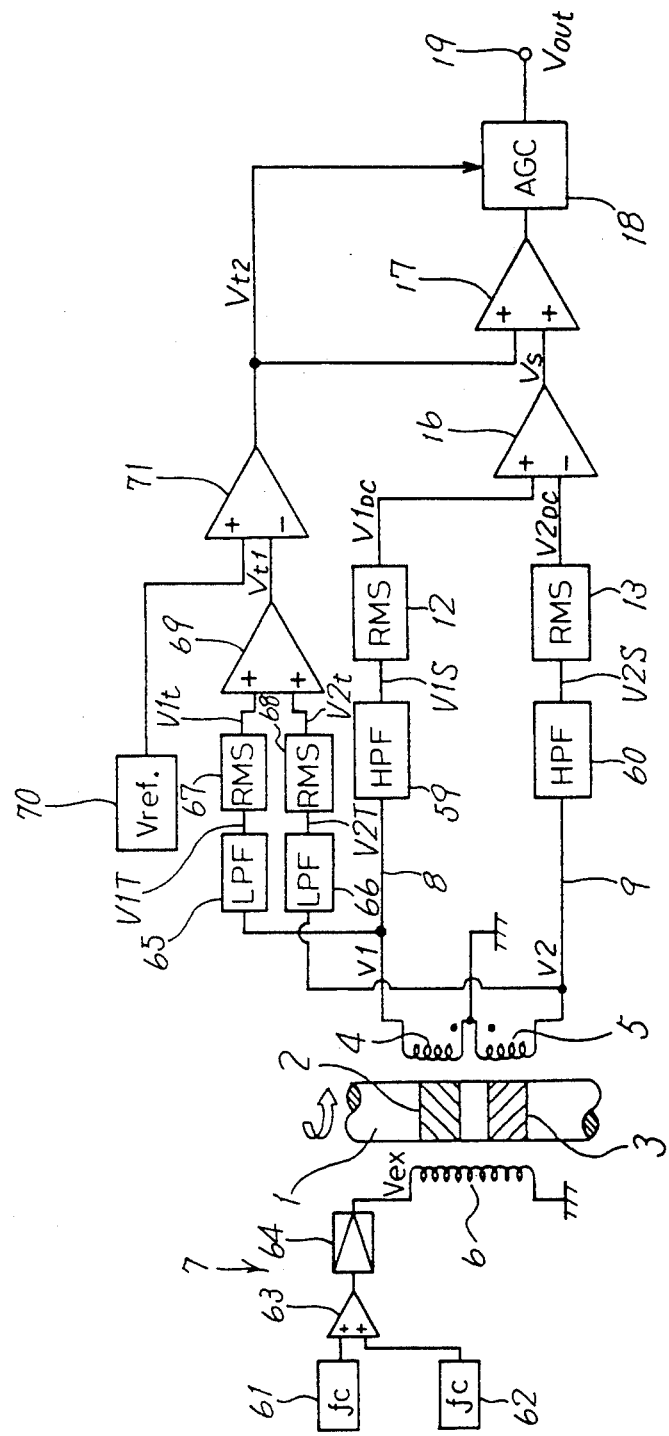
FIG. 16 is a circuit diagram of a torque measuring apparatus representing an eighth embodiment of the invention.

FIG. 16 shows a eighth embodiment of the invention. In this embodiment, there is provided a single exciting coil 6, and the voltage source for exciting the exciting coil 6 comprises a high frequency signal oscillator 61 for supplying a high-frequency exciting current to the exciting coil 6 to cause the sensing coils 4, 5 to output torque detection signals, a low-frequency signal oscillator 62 for supplying a low-frequency exciting current to the exciting coil 6 to cause the sensing coils 4, 5 to output temperature detection signals, a high-speed adder 63 for composing exciting currents from the oscillators 61, 62, and a power amplifier 64 for amplifying the output of the adder 63 to supply an amplified output to the exciting coil 6. Shown by Vex is exciting voltage.

Output lines 8, 9 are connected to the rectifier filters 12, 13 via high-pass filters 59, 60. Low-pass filters 65, 66 are connected to the output lines in parallel with the high-pass filters 59, 60 and rectifier filters 12, 13. The outputs of the low-pass filters 65, 66 are connected to an arithmetic unit 69 for addition via rectifier filters 67, 68 similar to the foregoing filters. The output side of the arithmetic unit 69 and an output line for a reference voltage generator 70 are connected to the input side of a comparator 71. The output side of the comparator 71, as is the case with the comparator 28 in the foregoing embodiments, is connected to the input side of the arithmetic unit 17 and is also connected to the auto gain controller 18 so as to adjust the amplification factor of the auto gain controller 18.

Figure 17A:
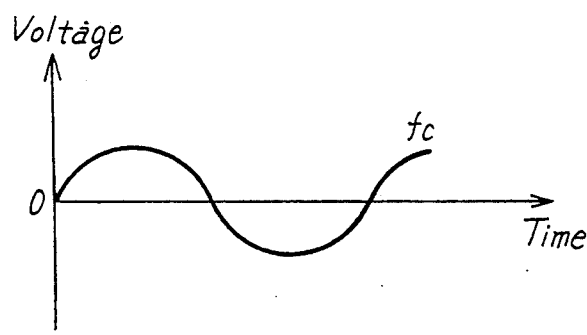
FIGS. 17A to 17C are graphs showing waveforms of exciting currents in the exciting circuit in FIG. 16.
Figure 17B:
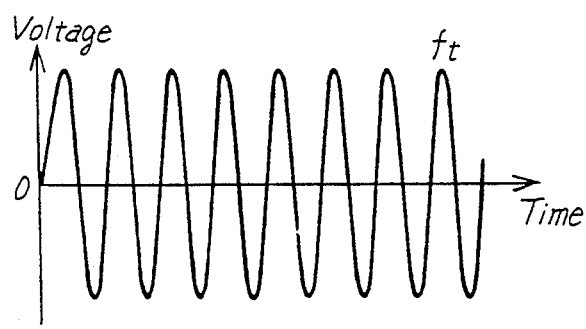
Figure 17C:
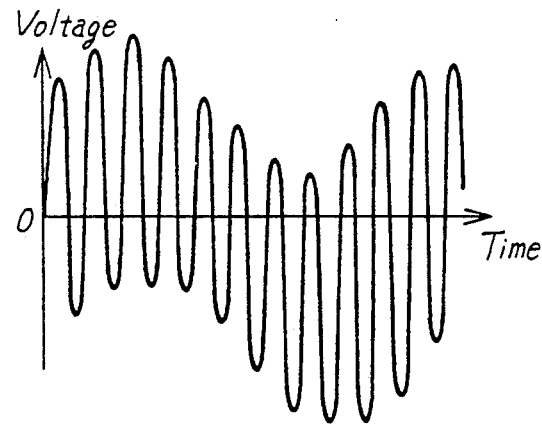
Figure 18:
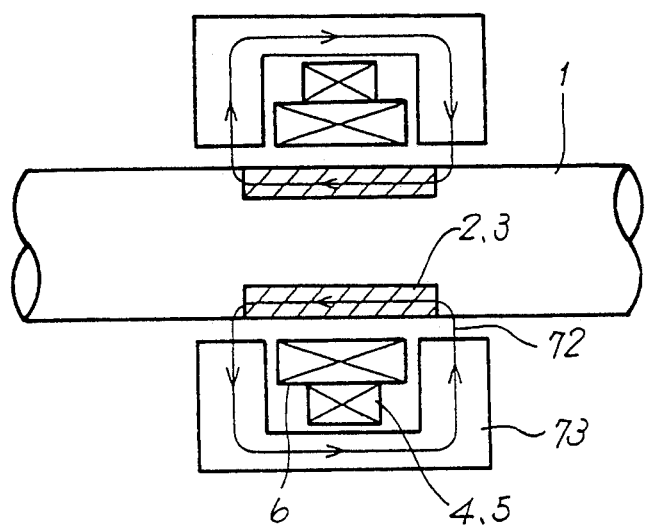
FIGS. 18 and 19 are diagrams showing flux profiles of high frequency and low frequency components of the exciting currents in FIG. 16.
Figure 19:
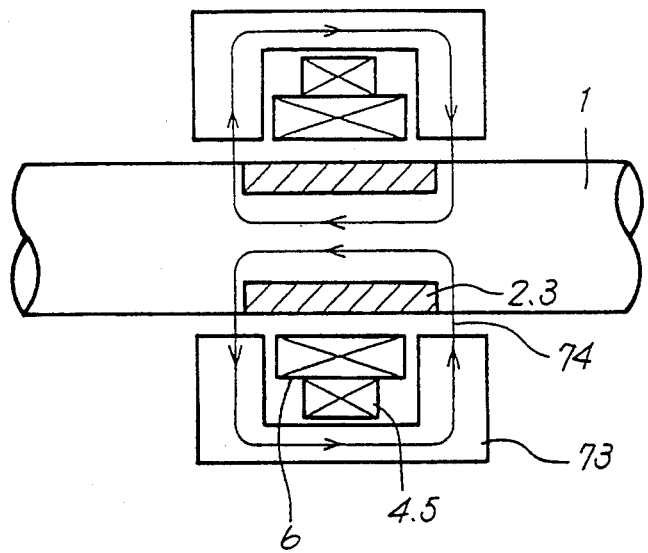

In the above noted arrangement, a resultant current (FIG. 17C) consisting of a low-frequency exciting current from the low-frequency signal oscillator 62 as shown in FIG. 17A and a high-frequency exciting current from the high-frequency signal oscillator 61 as shown in FIG. 17B is supplied to the exciting coil 6. FIG. 18 shows an aspect of flux distribution in the high-frequency exciting current. As shown, a flux 72 based on the high-frequency exciting current passes through the magnetically anisotropic portions 2, 3 formed on the surface of the shaft 1. Shown by 73 is a core which magnetically shields the coils 4, 5, 6. FIG. 19 shows an aspect of flux distribution in the low-frequency exciting current. This flux 74 based on the low-frequency exciting current passes through a portion of the shaft 1 which is located deep from the surface of the shaft 1.

Figure 20:
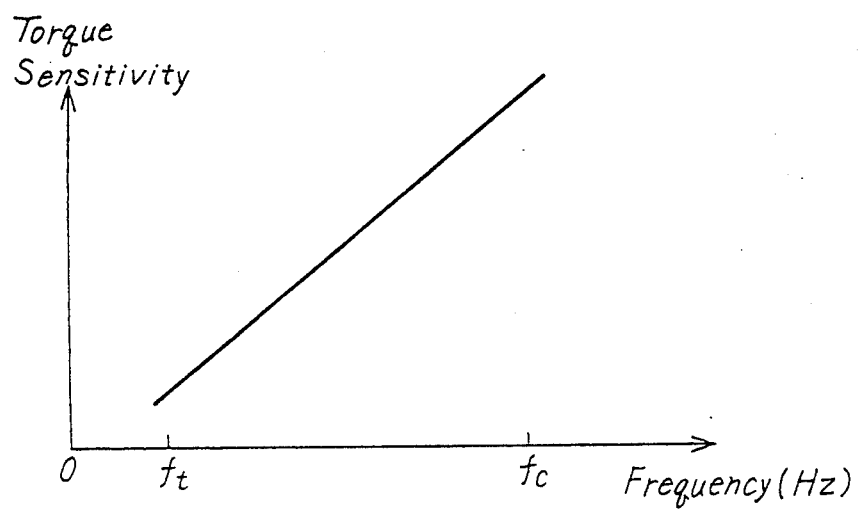
FIG. 20 is a graph showing the relationship between exciting frequency and torque detection sensitivity in the FIG. 16 circuit.

When torque is applied to the shaft 1, a change is caused to the magnetic permeability of the magnetically anisotropic portions 2, 3 formed on the shaft surface, and the flux based on the high-frequency exciting current passing through the shaft surface is thereby considerably influenced. The relationship between exciting current frequency and torque detection sensitivity in the FIG. 16 circuit is as shown in FIG. 20. Character fc represents frequency generated by the high-frequency signal oscillator 61, and ft represents frequency generated by the low-frequency signal oscillator 62. As shown, torque detection sensitivity becomes higher as the frequency of the exciting current becomes higher.

Figure 21:
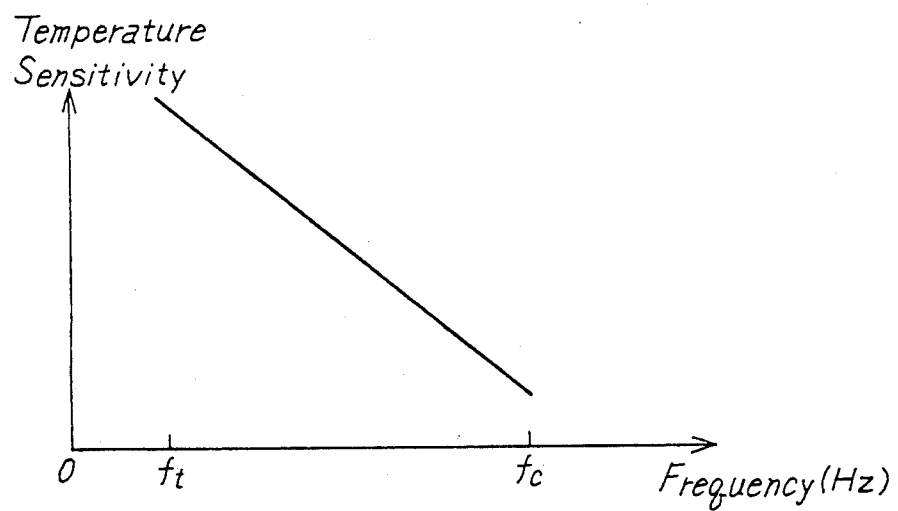
FIG. 21 is a graph showing the relationship between exciting frequency and temperature detection sensitivity in the FIG. 16 circuit.

When a temperature change occurs with the shaft 1, the flux based on the low-frequency exciting current passing through a portion located deep from the shaft surface is considerably affected. The relationship between exciting current frequency and temperature detection sensitivity in the FIG. 16 circuit is as shown in FIG. 21. Generally, magnetic resistance R is expressed by the following relation:

$$R = \frac{K}{\sqrt{\mu \rho}}$$

where, K represents constant, $\mu$ represents magnetic permeability (H/m), and $\rho$ represents resistivity. As shown, temperature detection sensitivity becomes higher as the frequency of the exciting current becomes lower. The reason for this is that in a low-frequency region, the ratio of volume resistivity $\rho$ of shaft portion to reluctivity R becomes higher, and the regulation of magnetic resistance R to temperature becomes higher.

Figure 22A:
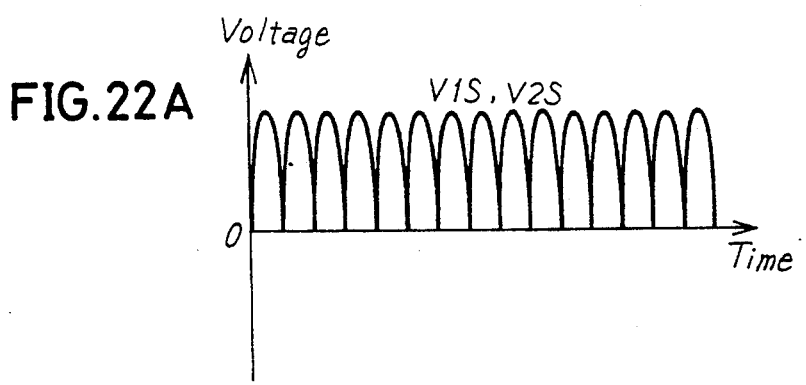
FIGS. 22A and 22B are graphs showing high-frequency torque signal components of output signals from the detecting coils in the FIG. 16 circuit.
Figure 22B:
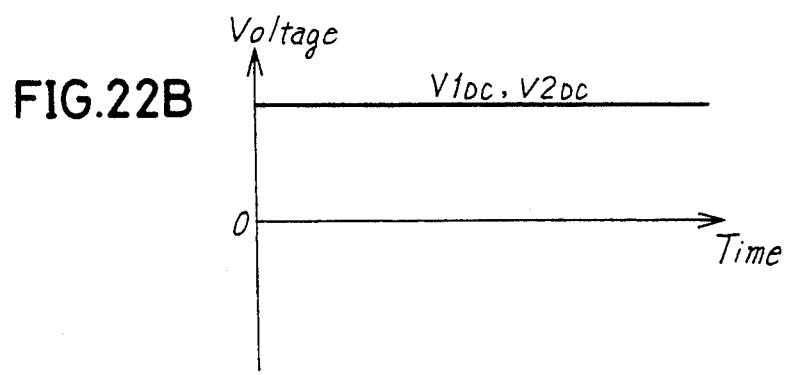

As stated above, when torque is applied to the shaft 1, the high-frequency components of output signals V1, V2 from the sensing coils 4, 5 are mainly liable to undergo changes. The high-frequency components are caused to pass through the high-pass filters 59, 60 to become signals V1S, V2S as shown in FIG. 22A, and are again caused to pass through the rectifier filters 12, 13 to become signals $V1_{DC}$, $V2_{DC}$ as shown in FIG. 22B.

Figure 23A:
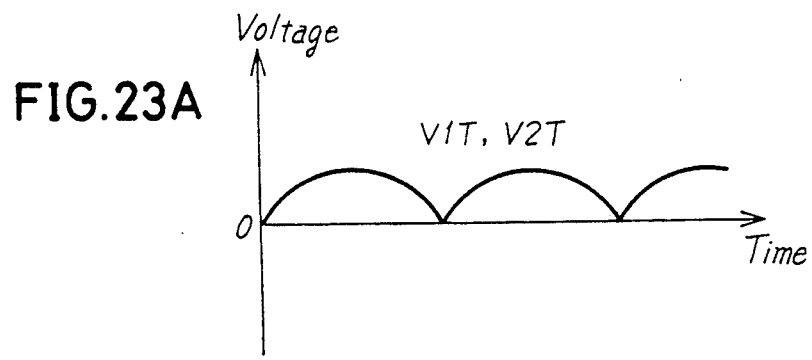
FIGS. 23A and 23B are graphs showing low-frequency temperature signal components of output signals from the detecting coils in the FIG. 16 circuit.
Figure 23B:
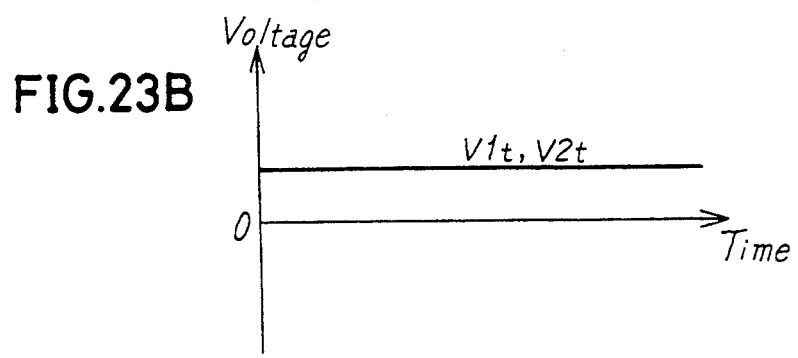

When a temperature change occurs with the shaft 1 and/or coils 4, 5, 6 in the FIG. 16 apparatus, a corresponding change occurs mainly with the low-frequency components of output signals V1, V2 from the sensing coils 4, 5. The low-frequency components are caused to pass through the low-pass filters 65, 66 to become signals V1T, V2T as shown in FIG. 23A, and are again caused to pass through the rectifier filters 67, 68 to become signals V1t, V2t as shown in FIG. 23B. These signals V1T, V2T are added up at the arithmetic unit 69 which in turn outputs a temperature detection signal $Vt_1$.

Signals V1t, V2t, which have passed through the rectifier circuits 67, 68, contain a variable component, though slight, which is proportional to the magnitude of the torque applied to the shaft 1. However, such variable component is set off when the signals V1t, V2t based on output signals from the sensing coils 4, 5 of the differential system are added up at the arithmetic unit 69. Accordingly, the temperature detection signal $Vt_1$ from the arithmetic unit 69 is substantially not subject to the influence of the torque applied to the shaft 1.

In the above noted high-frequency circuit, signals $V1_{DC}$, $V2_{DC}$ from the rectifier filters 12, 13 are subtracted at the arithmetic unit 16, and the temperature components contained slightly in these signals $V1_{DC}$, $V2_{DC}$ are subtracted accordingly at the arithmetic unit 16. Thus, the torque detection signal Vs is substantially not subject to the influence of the temperature change.

The temperature detection signal $Vt_1$ from the arithmetic unit 69 is input to a comparator 71 at which it is compared with the reference voltage Vref from the reference voltage generator 70. A temperature compensating signal $Vt_2$ corresponding to the amount of change from the ordinary temperature is output from the comparator 71 as in the case of the earlier described embodiments.

What is claimed is:

1. A temperature compensating device for a torque measuring apparatus of the magneto-strictive type including a magnetically anisotropic portion formed on the periphery of a torque transmission shaft, and sensing coil means provided in corresponding relation to the magnetically anisotropic portion for outputting an alternating current signal corresponding to the magnitude of a torque applied to the torque transmission shaft from the sensing coil means for measurement of the magnitude of the torque, said temperature compensating device comprising:

means for detecting the direct current resistance of said sensing coil means thereby to detect the temperature of said sensing coil means, means for temperature-compensating the detecting characteristics of said torque measuring apparatus on the basis of a detection signal from said detecting means, voltage division resistor means for applying a DC voltage to the sensing coil means means for detecting the direct current component only of the terminal voltage of the sensing coil means thereby to find the DC resistance of the sensing coil means, and means for deriving an alternating current component only out of an output signal from the sensing coil means thereby to provide a torque detection signal.

2. A temperature compensating device for a torque measuring apparatus as set forth in claim 1, wherein the torque transmission shaft has a pair of magnetically anisotropic portions formed on the periphery thereof, with a pair of sensing coils arranged in corresponding relation to the magnetically anisotropic portions, the sensing coils being disposed with their outputs in reversed polarity.

3. A temperature compensating device for a torque measuring apparatus as set forth in claim 2, further comprising exciting coils for excitation of the sensing coils, and means for supplying an AC voltage to the exciting coils.

4. A temperature compensating device for a torque measuring apparatus as set forth in claim 2, wherein a bridge circuit comprises said pair of sensing coils and a pair of resistors connected to the sensing coils, said temperature compensating means further comprising means for supplying an AC voltage to said bridge circuit, and means for deriving an AC signal only from said bridge circuit.

5. A temperature compensating device for a torque measuring apparatus as set forth in claim 2, further comprising means for detecting the temperature gradient of the locations at which the sensing coils are disposed from the difference between the DC resistance of one of said sensing coils and the DC resistance of the other sensing coil, and means for temperature-compensating the detection characteristics of said torque measuring apparatus.

6. A temperature compensating device for a torque measuring apparatus as set forth in claim 1, wherein the torque transmission shaft has a single magnetically anisotropic portion formed on the periphery thereof, with a single sensing coil disposed in corresponding relation to the magnetically anisotropic portion.

7. A temperature compensating device for a torque measuring apparatus of the magneto-strictive type including a magnetically anisotropic portion formed on the periphery of a torque transmission shaft, sensing coil means provided in corresponding relation to the magnetically anisotropic portion, and exciting coil means for excitation of the sensing coil means, so that an alternating current signal corresponding to the magnitude of a torque applied to the torque transmission shaft is output from the sensing coil means for measurement of the magnitude of the torque, said temperature compensating device comprising:
  means for detecting the direct current resistance of said exciting coil means thereby to detect the temperature of said exciting coil means,
  means for temperature-compensating the detecting characteristics of said torque measuring apparatus on the basis of a detection signal from said detecting means
  means for supplying an AC voltage to the exciting coil means,
  means for applying a DC voltage to the exciting coil means through a voltage division resistor, and
  means for detecting the direct current component only of the terminal voltage of the exciting coil means thereby to find the DC resistance of the exciting coil means.

8. A temperature compensating device for a torque measuring apparatus as set forth in claim 7, wherein the torque transmission shaft has a pair of magnetically anisotropic portions formed on the periphery thereof, with a pair of exciting coils arranged in corresponding relation to the magnetically anisotropic portions.

9. A temperature compensating device for a torque measuring apparatus as set forth in claim 8, wherein the pair of exciting coils are disposed with their outputs in reversed polarity relative to each other, with separate AC exciting power supplies connected to the respective exciting coils, said AC exciting power supplies being shifted 180 degrees in phase relative to each other.

10. A temperature compensating device for a torque measuring apparatus of the magneto-strictive type including magnetically anisotropic means formed on the periphery of a torque transmission shaft, and sensing coil means provided in corresponding relation to the magnetically anisotropic means, so that an alternating current signal corresponding to the magnitude of a torque applied to the torque transmission shaft is output from the sensing coil means for measurement of the magnitude of the torque, comprising:
  the AC exciting current for exciting said sensing coil means being a resultant current consisting of a high-frequency current for torque detection signaling and a low-frequency current for equipment-temperature detection signaling;
  said temperature compensating means further comprising:
  means for detecting the temperature of equipment on the basis of a temperature detection low-frequency signal from said sensing coil means, and
  means for temperature-compensating a torque detection signal on the basis of a detection signal from said detecting means.

11. A temperature compensating device for a torque measuring apparatus as set forth in claim 10, wherein:
  the torque transmission shaft has a pair of magnetically anisotropic portions formed on the periphery thereof,
  with a pair of sensing coils arranged in corresponding relation to the magnetically anisotropic portions,
  the sensing coils being disposed with their outputs in reversed polarity, and
  said temperature compensating means further comprising:
  means for calculating the difference between torque detection signals from the sensing coils to provide a torque detection signal, and
  means for calculating the sum of temperature detection signals from the sensing coils to provide a temperature detection signal.

* * * * *